UNITED STATES PATENT OFFICE.

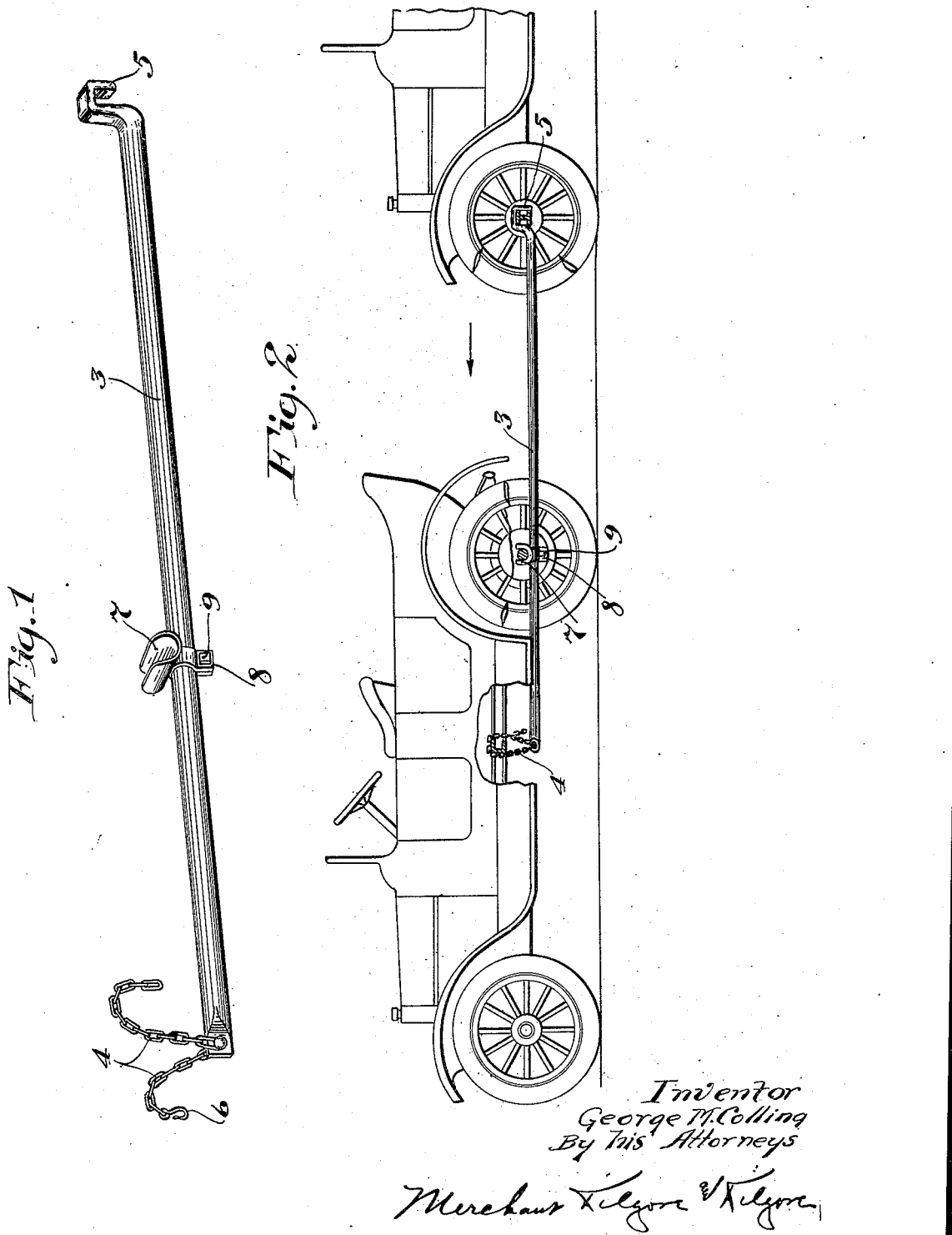

GEORGE M. COLLING, OF CARRINGTON, NORTH DAKOTA.

COMBINED TOW AND PUSH BAR.

1,422,928.

Specification of Letters Patent. Patented July 18, 1922.

Application filed March 9, 1921. Serial No. 450,825.

*To all whom it may concern:*

Be it known that I, GEORGE M. COLLING, am a citizen of the United States, residing at Carrington, in the county of Foster and State of North Dakota, have invented certain new and useful Improvements in Combined Tow and Push Bars; and I do hereby declare the following to be a full, clear, and exact description of the invention, such as will enable others skilled in the art to which it appertains to make and use the same.

My invention has for its object to provide an extremely simple and highly efficient device for towing or pushing disabled automobiles.

To the above end, the invention consists of the novel devices and combinations of devices hereinafter described and defined in the claim.

In the accompanying drawings, which illustrate the invention, like characters indicate like parts throughout the several views.

Referring to the drawings:

Fig. 1 is a perspective view of the combined tow and push bar; and

Fig. 2 is a view in side elevation with some parts broken away and sectioned, showing the invention applied so that a disabled automobile may be pushed by another automobile.

The combined tow and push bar 3 has attached to one of its ends one of the ends of a pair of short chains 4, and the other end of said bar has formed therewith a downwardly extended relatively wide flat hook 5. The chains 4 may be secured around one of the bars of an automobile by providing one of said chains with a hook 6 adapted to interlock with any one of the links of the other of said chains.

Extending transversely over the bar 3 is channel-shape saddle 7 having on its under side a transversely split clamp 8 slidably mounted on said bar and provided with a nut-equipped bolt for frictionally securing said clamp to the bar 3 in different longitudinal adjustments thereon.

To illustrate one use of the invention, there is shown in the drawings two automobiles, one ahead of the other and the foremost of which may be considered to be disabled by having one of its rear wheels broken. To apply the invention so that the rear automobile may push the other or disabled automobile, the side of the automobile, at the broken wheel, is lifted by a jack and the end of the bar 3, having the chains 4, is extended under said automobile to a position where the chains 4 may be fastened around a member of the frame thereof. The rear or other end of the bar 3 is then lifted and its hook 5 interlocked with the front axle of the rear automobile. The saddle 7 is then adjusted on the bar 3 until it comes directly under the rear axle housing at one side of the automobile having the broken wheel. The front end of the bar 3 is then lifted until stopped by the engagement of the saddle 7 with the rear axle housing of the front automobile. With the front end of the bar 3 thus lifted, the chains 4 may be passed over a portion of the frame of the front automobile and secured, one to the other, by the hook 6. The jack may then be removed to permit the entire weight of the automobile, at the broken wheel, to rest in the saddle 7 on the bar 3. The weight of the automobile on the bar 3 will securely hold the hook 5 interlocked with the front axle of the rear automobile. With the disabled automobile thus supported and connected to the rear automobile, said disabled automobile may be pushed to any place desired by the rear automobile with somebody sitting in the front automobile to steer the same.

In case the rear wheels of an automobile are locked, the automobile may be pushed in this same manner, provided one of the rear wheels is held out of engagement with the ground by the bar 3, so as to permit the differential mechainsm to work.

If one of the front wheels of an automobile is broken, the disabled automobile may be towed by turning the bar 3 end for end, from the position shown in the drawings, and securing the chains 4 to the frame of the disabled automobile with the front axle thereof resting in the saddle 7 and with the hook 5 interlocked with the rear axle of the automobile towing the disabled automobile.

While the invention has been described as pushing or towing an automobile having only one broken wheel, the same may be similarly used in case both rear or both front wheels are broken. The device may be also used for pushing or towing automobiles otherwise damaged than by having their wheels broken.

In actual usage, the invention has proven highly efficient for the purpose described. The term "automobile" is herein used in a broad sense to include trucks or other vehicles.

What I claim is:

A combined tow and push bar having at one end a hook applicable to one of the axles of a vehicle and having at its other end means for attaching said bar to a second vehicle, and a saddle adjustable on the bar for supporting one of the axles of one of said vehicles.

In testimony whereof I affix my signature.

GEORGE M. COLLING.